United States Patent
Mori

(10) Patent No.: US 8,824,010 B2
(45) Date of Patent: Sep. 2, 2014

(54) IMAGE FORMATION PROCESSING APPARATUS AND IMAGE PROCESSING METHOD

(71) Applicant: Canon Kabushiki Kaisha, Tokyo (JP)

(72) Inventor: Hiroshi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 13/658,163

(22) Filed: Oct. 23, 2012

(65) Prior Publication Data

US 2013/0100498 A1    Apr. 25, 2013

(30) Foreign Application Priority Data

Oct. 25, 2011    (JP) .................. 2011-234201

(51) Int. Cl.
*G06F 15/00* (2006.01)
*G06F 9/46* (2006.01)
*G06F 15/16* (2006.01)
*G06K 1/00* (2006.01)
*G06T 1/00* (2006.01)
*G06T 1/20* (2006.01)
*H04N 1/60* (2006.01)
*G06K 15/02* (2006.01)

(52) U.S. Cl.
CPC ........ *G06K 15/1822* (2013.01); *G06K 15/1857* (2013.01)
USPC ........... 358/1.9; 358/2.1; 358/2.99; 358/3.26; 358/448; 382/276; 382/302; 382/303; 345/502; 345/503; 345/504; 345/505; 345/506; 345/519; 345/556; 345/619; 345/629; 718/105

(58) Field of Classification Search
USPC ............... 358/1.9, 2.1, 3.01, 3.13, 3.16, 3.21, 358/3.22, 3.23, 3.24, 1.17, 1.18, 517, 525, 358/530, 537, 538, 539, 540, 448, 450, 464, 358/515, 505, 506, 512, 516, 523, 524; 382/162, 163, 164, 165, 166, 167, 173, 382/180, 232, 234, 235, 254, 260, 276, 284, 382/285, 286, 289, 291, 296, 297, 299, 300, 382/302, 303, 304; 345/585, 522, 581, 586, 345/591, 592, 606, 619, 621, 629, 630, 632, 345/634, 643, 649, 655, 656, 658, 501, 502, 345/503, 504, 505, 506; 718/105, 106, 107; 712/16, 28, 200, 201, 203, 221, 223, 712/224, 225, 226
See application file for complete search history.

(56) References Cited

U.S. PATENT DOCUMENTS 6,108,460 A * 8/2000 Rich .............................. 382/304
6,570,571 B1 * 5/2003 Morozumi .................... 345/505

(Continued)

FOREIGN PATENT DOCUMENTS

JP    6-274608 A    9/1994

*Primary Examiner* — Marivelisse Santiago Cordero
*Assistant Examiner* — Jonathan Beckley
(74) *Attorney, Agent, or Firm* — Canon U.S.A., Inc. IP Division

(57) ABSTRACT

To realize effective load distribution and improve the performance in image formation processing, an image processing apparatus includes a first image processing unit configured to perform image processing on a drawing area, a second image processing unit configured to be differentiated from the first image processing unit, a load analysis unit configured to analyze a composition processing load of an object in the drawing area, a rotational angle analysis unit configured to analyze a rotational angle of the object in the drawing area, and a load distribution determination unit configured to determine whether to distribute a part of image formation processing to be applied on the drawing area from the first image processing unit to the second image processing unit based on the analyzed composition processing load of the object and the analyzed rotational angle of the object.

19 Claims, 16 Drawing Sheets

(56) References Cited

U.S. PATENT DOCUMENTS

| | | | |
|---|---|---|---|
| 6,965,691 B2 * | 11/2005 | Walmsley et al. | 382/162 |
| 7,495,669 B2 * | 2/2009 | Ushida et al. | 345/537 |
| 7,587,716 B2 * | 9/2009 | Yoshimura | 718/100 |
| 7,965,373 B2 * | 6/2011 | Hoeks et al. | 355/53 |
| 8,108,661 B2 * | 1/2012 | Lee et al. | 712/225 |
| 8,466,921 B2 * | 6/2013 | Achiwa et al. | 345/502 |
| 8,487,942 B2 * | 7/2013 | Kota et al. | 345/502 |
| 2003/0031375 A1 * | 2/2003 | Enomoto | 382/255 |
| 2003/0160980 A1 * | 8/2003 | Olsson et al. | 358/1.9 |
| 2004/0125103 A1 * | 7/2004 | Kaufman et al. | 345/419 |
| 2004/0223003 A1 * | 11/2004 | Heirich et al. | 345/629 |
| 2006/0267989 A1 * | 11/2006 | Campbell et al. | 345/502 |

* cited by examiner

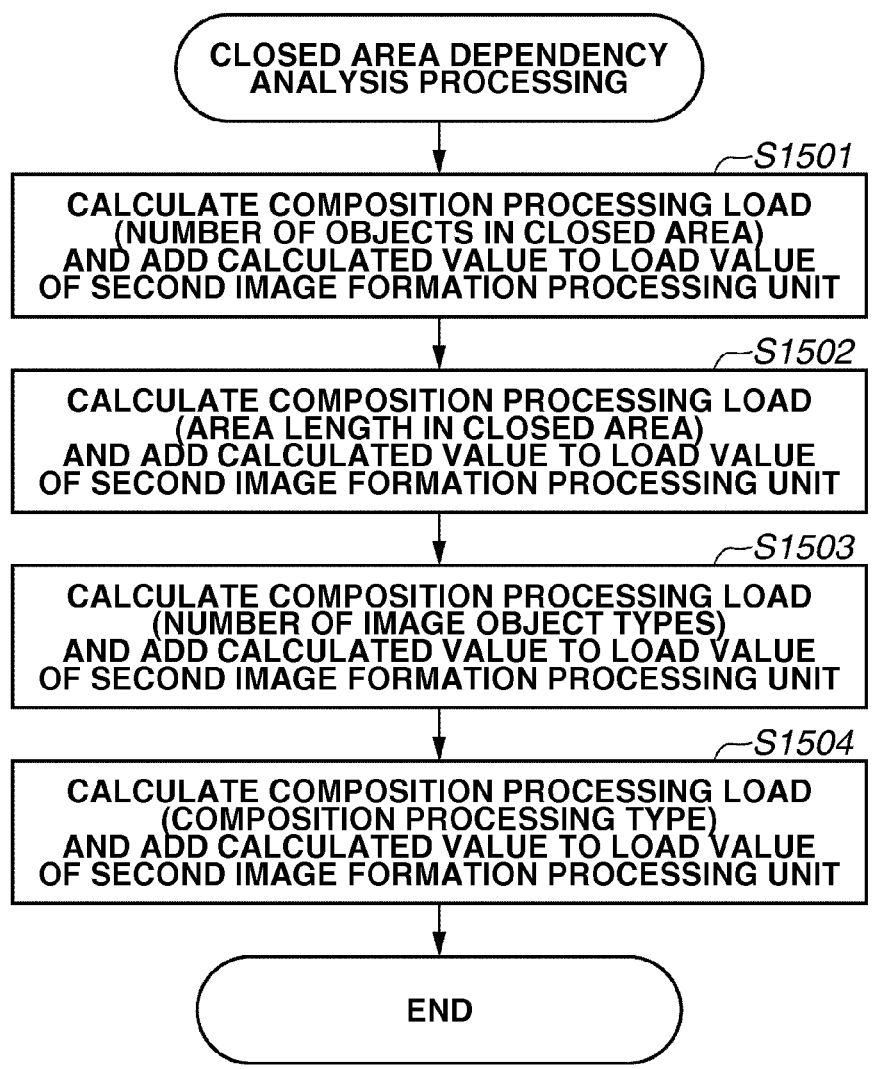

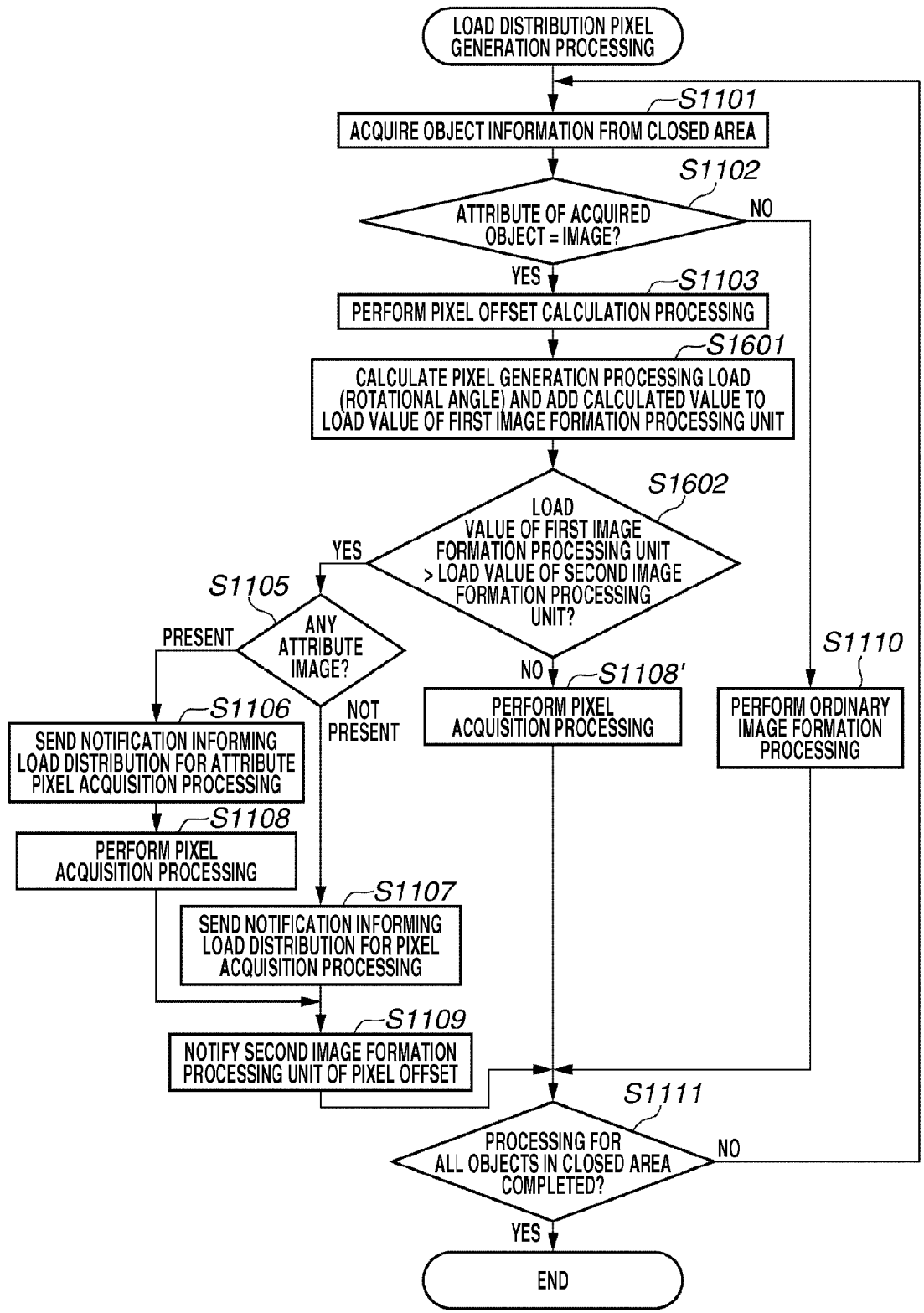

IMAGE FORMATION PROCESSING APPARATUS AND IMAGE PROCESSING METHOD

BACKGROUND OF THE INVENTION

1. Field of the Invention

The present invention relates to an image formation technique that can realize load distribution in image processing.

2. Description of the Related Art

It is conventionally known to perform image formation processing based on the depth of an object included in a scanline, which is referred to as "scanline model", as one of image formation processing techniques. For example, the image formation processing can be performed on a target page 200 illustrated in FIG. 2 on a line-to-line basis.

More specifically, in a drawing line 201, the image formation processing of a page line 210 indicating a pixel of the page 200, an image line 211 indicating a pixel of an image object 202, and a transmissive monochrome line 212 indicating a pixel of a transmissive monochrome graphic object 203 is performed.

In this case, the image formation processing includes dividing an object on the page 200 into a plurality of closed areas, for example, a closed area "0" 205, a closed area "1" 206, a closed area "2" 207, a closed area "3" 208, and a closed area "4" 209. Each closed area is divided by a contour (hereinafter, referred to as "edge"). Each closed area is a processing target area to be independently subjected to the image formation processing.

Further, the image formation processing performed on each closed area will be described. For example, if the processing target area is the closed area "1" 206 illustrated in FIG. 3, the image formation processing includes performing application information generation processing 312 based on white color information 310, which indicates color information of the page 200, and generating a white pixel 316 that represents a pixel of the page line 210 in the closed area "1" 206.

Further, the image formation processing includes calculation processing 313 for calculating a pixel offset 317 of a read image based on image information 311. The pixel offset calculation to be performed in this case can be realized by affine transformation processing while taking designated rotation, modification, and enlargement/reduction into consideration.

Further, the image formation processing includes acquiring actual pixel information from an offset indicated by the pixel offset 317 to generate an image pixel 318 that represents a pixel of the image line 211 in the closed area "1" 206. As a final process, the image formation processing includes performing composition processing 315 using the white pixel 316 and the image pixel 318 to acquire a closed area "1" pixel 319 that represents a final color value of the closed area "1" 206. The above-described image formation processing is repetitively performed for the remaining closed areas to accomplish the image formation of the page 200.

Further, to improve performance and reduce the cost in image formation processing, a multiprocessor is recently available to realize multi processing technique. In image formation processing, distribution of the processing can be realized by causing a plurality of image formation processing units, such as a first image formation processing unit 400 and a second image formation processing unit 401 illustrated in FIG. 4, to perform predetermined processing.

Further, the multiprocessor is usable to realize the scanline model image formation processing. For example, pixel generation processing 322 including processing 312, processing 313, processing 314) for generating pixels of each object may be allocated to the first image formation processing unit 400. Further, pixel composition processing 323 including the composition processing 315 may be allocated to the second image formation processing unit 401.

As described above, using a plurality of image formation processing units is useful to realize the distribution of the processing. Further, if processing to be allocated to each of a plurality of image formation processing units is determined beforehand, a predetermined CPU-dedicated command capable of increasing the processing speed or expansion of a hardware configuration can be realized by using only one image formation processing unit. As a result, the processing can be speedily accomplished and the cost can be reduced.

Further, as a technique capable of realizing the load distribution among a plurality of image formation processing units, a multiprocessor-based technique discussed in Japanese Patent Application Laid-Open No. 6-274608 includes dividing image formation processing to be performed for each drawing object into a plurality of processing blocks. The conventional technique further includes allocating each divided image formation processing to an optimum image formation processing unit having a relatively light load with reference to the load status of each image formation processing unit.

According to the above-described processing distribution system that allocates predetermined processing to each of a plurality of image formation processing units as illustrated in FIG. 4, the processing load of each image formation processing unit is variable depending on the tendency of data to be processed. The load distribution in image processing may not be realized in an optimum way. For example, if the rotational angle is 0° or 180° as illustrated in FIG. 5, the process of reading pixel data from an image memory area 500 is performed along an arrow 501 for the 0 degree rotation and an arrow 502 for the 180 degree rotation.

In this case, the pixel data acquisition processing 314 to be performed in acquiring a pixel 1 includes accessing the image memory area 500 and loading a predetermined size of pixel data into a cache 512. The probability that the subsequent pixels 2 to 6 are present in the cache is high. Therefore, there is a tendency that the subsequent pixels 2 to 6 are acquirable from the cache 512, i.e., from the data loaded in the process of acquiring the pixel 1.

Therefore, the number of operations repetitively accessing the image memory area 500 can be reduced. It is feasible to perform the pixel generation processing 321 at a relatively higher speed. On the other hand, if the rotational angle is 90° or 270°, the process of reading pixel data from the image memory area 500 is performed along an arrow 503 for the 90 degree rotation and an arrow 504 for the 270 degree rotation.

In this case, the pixel data acquisition processing 314 to be performed in acquiring a pixel 13 includes accessing the image memory area 500 and loading a predetermined size of pixel data in the cache 512. However, in the process of acquiring a pixel 7, the probability that the pixel 7 is included in the predetermined size of pixel data loaded in the cache is low because the pixel 7 is present in an area far from the pixel 13. Accordingly, the probability that the pixel 7 is not present in the cache is high. Therefore, it is required to repeat the processing for loading a predetermined size of pixel data into the cache until the pixel 7 can be acquired.

Processing required to acquire the next pixel 1 is similar to the processing required to acquire the pixel 7. Accordingly, when the rotational angle is 90° or 270°, the cache cannot be effectively used and the number of operations repetitively accessing the image memory area 500 tends to increase. A relatively long time is required to complete the pixel generation processing 321. Further, when the rotational angle is an arbitrary angle other than 0°, 90°, 180°, and 270°, processing to be required in this case tends to be similar to the above-described processing for the 90° or 270° rotation if the arbitrary rotational angle is closer to 90° or 270° than 0° (360°) or 180°. The meaning of "the arbitrary rotation angle is closer to 90° or 270° than 0° (360°) or 180°" is, for example, that the arbitrary rotation angle is larger than 45° and smaller than 135°, or larger than 225° and smaller than 315°. In the present exemplary embodiment, such an angle is referred to as a first type angle. On the other hand, if the arbitrary rotational angle is closer to 0° (360°) or 180° than 90° or 270°, processing to be required in this case tends to be similar to the above-described processing for the 0° or 180° rotation. The meaning of "the arbitrary rotational angle is closer to 0° (360°) or 180° than 90° or 270°" is, for example, that the arbitrary rotation angle is larger than 0° and equal to or smaller than 45°, equal to or larger than 135° and equal to or smaller than 225°, or equal to or larger than 315° and smaller than 360°. In the present exemplary embodiment, such an angle is referred to as a second type angle. In short, the processing load tends to vary depending on the rotational angle.

Further, in the pixel composition processing 322, the processing load in the closed area "0" 205 tends to become lighter because the number of overlapped objects is small, namely because the number of pixels to be subjected to the composition processing is small.

On the other hand, the processing load in the closed area "2" 207 tends to become heavier because the number of overlapped objects is large, namely because the number of pixels to be subjected to the composition processing is large. Further, the processing load tends to vary depending on the contents of a plurality of overlapped objects to be subjected to the composition processing. If the processing to be allocated is determined beforehand, the processing load is variable depending on the difference in rotational angle and the presence of the composition processing.

Further, the conventional technique discussed in Japanese Patent Application Laid-Open No. 6-274608 includes calculating the processing load for each object and performing the load distribution in image processing based on the calculated load amount. However, according to the scanline model image formation processing, the processing load is variable depending on each area even if the target object is the same. From the reasons described above, the conventional technique is unable to appropriately determine the processing load and unable to effectively perform the load distribution.

For example, in a case where a drawing line 601 of a page 600 illustrated in FIG. 6 is drawn, the processing includes dividing a processing target area into a plurality of closed areas illustrated on the right side of FIG. 6. In this case, a transmissive monochrome graphic object 603 straddles a closed area "5" 604 and a closed area "6" 605. Each closed area is subjected to the drawing processing. In this case, the composition processing for a transmissive monochrome line 612 in the closed area "5" 604 is performed based on a combination with an image line 611. Therefore, performing the composition processing for each pixel is required.

On the other hand, the composition processing for the transmissive monochrome line 612 in the closed area "6" 605 is performed based on a combination with a page line 610. Therefore, the composition processing to be performed in this case is simply combining the processing target with the monochrome representing the color of the page. Therefore, regardless of the number of pixels, the realization of the processing requires only one composition processing and a plurality of outputs of the composition result. More specifically, there is a case where considering the dependency on other object in the closed area (e.g., overlap between objects, type of the composition, etc.) is required in the load determination. In this respect, the above-described conventional technique is unable to take the dependency into consideration in the load determination.

Further, the processing order in the scanline model image formation processing is dependent on the drawing processing to be performed for each closed area. Therefore, if the load distribution and the processing are performed on an object-by-object basis, it is unable to maintain optimum performances because the parallelism between respective processing cannot be maintained.

For example, the drawing processing of a drawing line 621 of a page 620 includes dividing a processing target area into a plurality of closed areas illustrated on the right side of FIG. 6. In this case, if the conventional technique is employed to divide the processing on an object-by-object basis, the image formation processing along an image line 631 straddles a closed area "5" 624 and a closed area "6" 625. Accordingly, the processing cannot be accomplished unless the image formation along the image line 631 is thoroughly completed.

Accordingly, the composition processing for combining the image line 631 with a transmissive monochrome line 632 does not start before completing the image formation processing of the image line 631. In other words, it is unable to maintain the parallelism between the image formation and the composition processing. Accordingly, it is desired to provide a load distribution technique that can solve the above-described conventional problems.

SUMMARY OF THE INVENTION

According to an aspect of the present invention, an image processing apparatus includes a first image processing unit configured to perform image processing on a drawing area; a second image processing unit configured to be differentiated from the first image processing unit; a load analysis unit configured to analyze a composition processing load of an object in the drawing area; a rotational angle analysis unit configured to analyze a rotational angle of the object in the drawing area; and a load distribution determination unit configured to determine whether to distribute a part of image formation processing to be applied on the drawing area from the first image processing unit to the second image processing unit based on the analyzed composition processing load of the object and the analyzed rotational angle of the object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 is a flowchart illustrating details of closed area dependency analysis processing (to be performed in step S802) according to a second exemplary embodiment of the present invention.

FIG. 16 is a flowchart illustrating details of load distribution pixel generation processing (to be performed in step S805) according to the second exemplary embodiment of the present invention.

DESCRIPTION OF THE EMBODIMENTS

Various exemplary embodiments, features, and aspects of the invention will be described in detail below with reference to the drawings.

Figure 1:
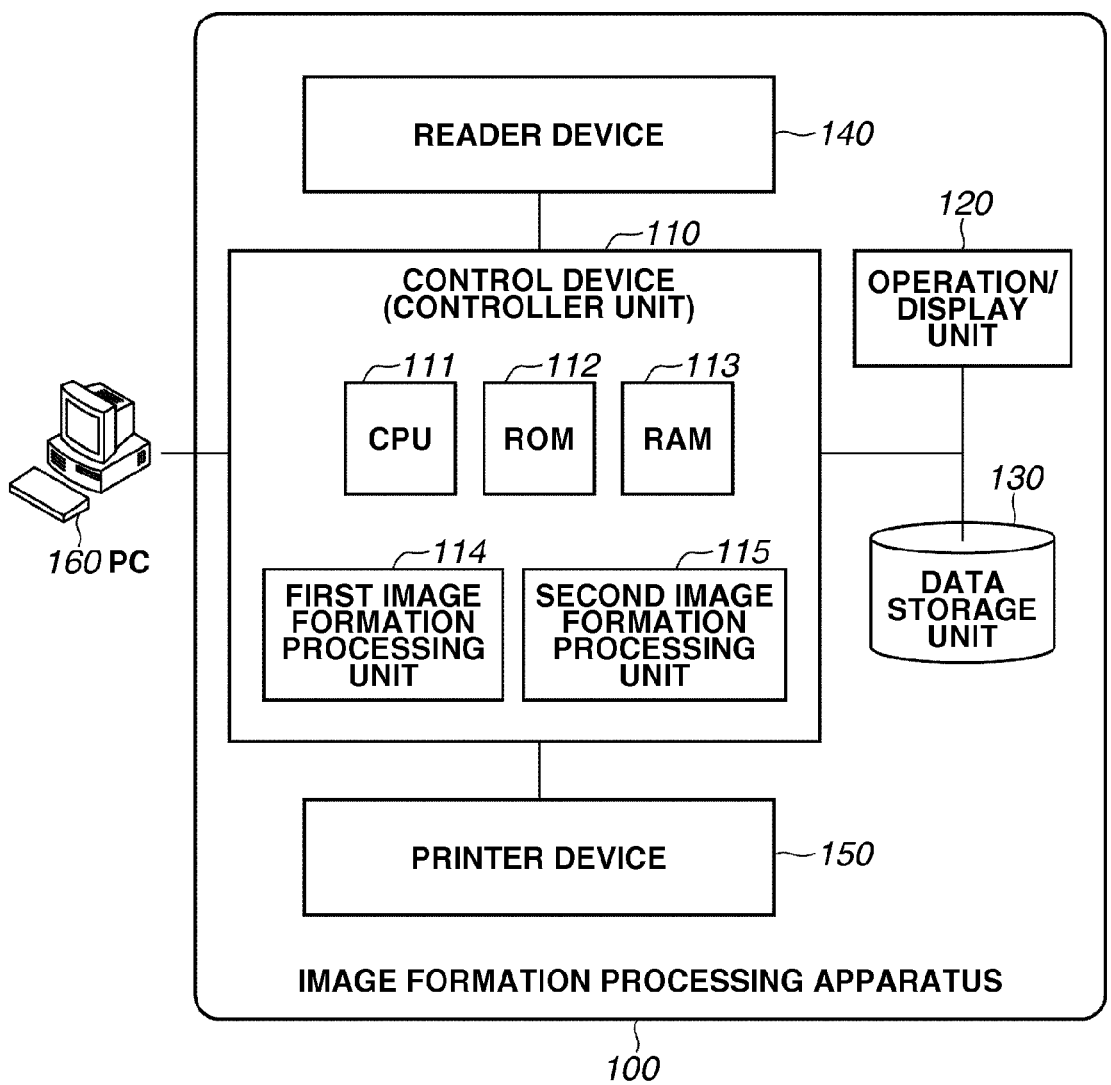
FIG. 1 is a block diagram illustrating an example of an image formation processing apparatus 100 according to an exemplary embodiment of the present invention.
Figure 2:
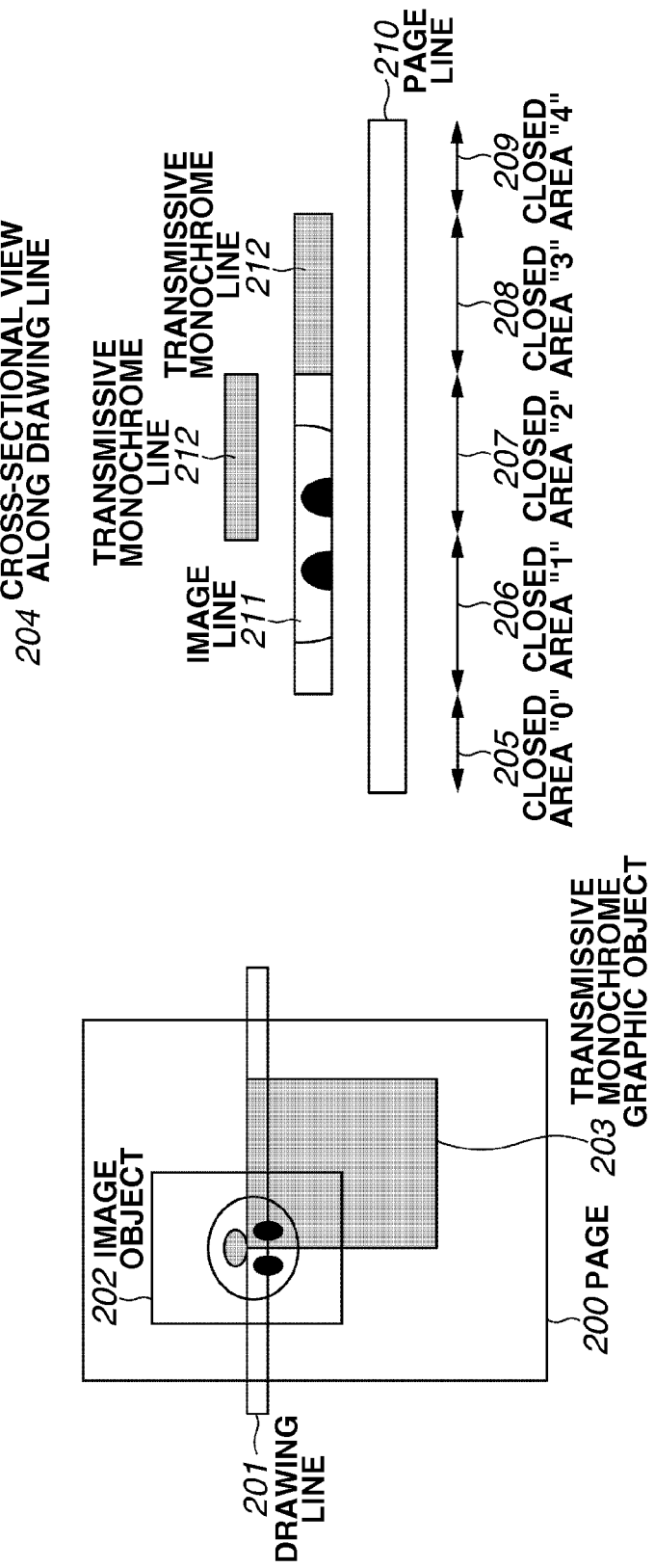
FIG. 2 illustrates an example of a scanline model image formation method, which includes image formation processing to be performed on a line-to-line basis, according to the present invention.

In an exemplary embodiment of the present invention, a multi-function printer (MFP) is employed as an image formation processing apparatus 100 illustrated in FIG. 1, although it is needless to say that a single function printer (SFP), a laser beam printer (LBP), or another printer (e.g., an inkjet print) is employable similarly.

FIG. 1 is a block diagram illustrating an example of an image formation processing apparatus that includes a controller, as an electronic component that relates to the present invention. The image formation processing apparatus 100 is connected to a host computer (PC) 160 via a local area network (LAN), such as Ethernet (registered trademark). The image formation processing apparatus 100 includes a control device (i.e., a controller unit) 110, an operation/display unit 120, a data storage unit 130, a reader device 140, and a printer device 150. The control device 110 is configured to control the operation/display unit 120, the data storage unit 130, the reader device 140, and the printer device 150.

The control device 110 includes a central processing unit (CPU) 111, a read only memory (ROM) 112, and a random access memory (RAM) 113. The CPU 111 can perform various processing for controlling the image formation processing apparatus 100 based on programs stored in the ROM 112 or another storage medium. Further, the control device 110 includes a first image formation processing unit 114 and a second image formation processing unit 115, which can perform pixel generation, pixel composition, and attribute pixel acquisition (as described later), based on image data, document data, and printing device control language (e.g., ESC code, Page Description Language (PDL)).

In the present exemplary embodiment, image formation processing may be simply referred to as image processing. Each of the first image formation processing unit 114 and the second image formation processing unit 115 may be configured in various ways. For example, each of the first image formation processing unit 114 and the second image formation processing unit 115 may be constituted by a central processing unit (CPU).

In this case, the CPU 111 loads an image processing program from the ROM 112 or another storage medium into each CPU of the first image formation processing unit 114 and the second image formation processing unit 115. The CPU 111 causes respective CPUs to execute the loaded image processing program. Further, each of the first image formation processing unit 114 and the second image formation processing unit 115 may be configured as a hardware device.

The printer device 150 performs a printout operation based on image data. The operation/display unit 120 includes a keyboard that enables users to perform various print settings for image printout processing, and a liquid crystal panel that can display operation buttons that are usable to perform image printout settings.

The data storage unit 130 can store or hold print data, such as image data, document data, and printing device control language (e.g., ESC code and page description language (PDL)). For example, the data storage unit 130 can store or hold image data, document data, and PDL received from the host computer (PC) 160 via the LAN as well as image data acquired via the reader device 140.

An exemplary embodiment of the present invention is described based on the image formation processing apparatus having the above-described configuration.

Figure 7:
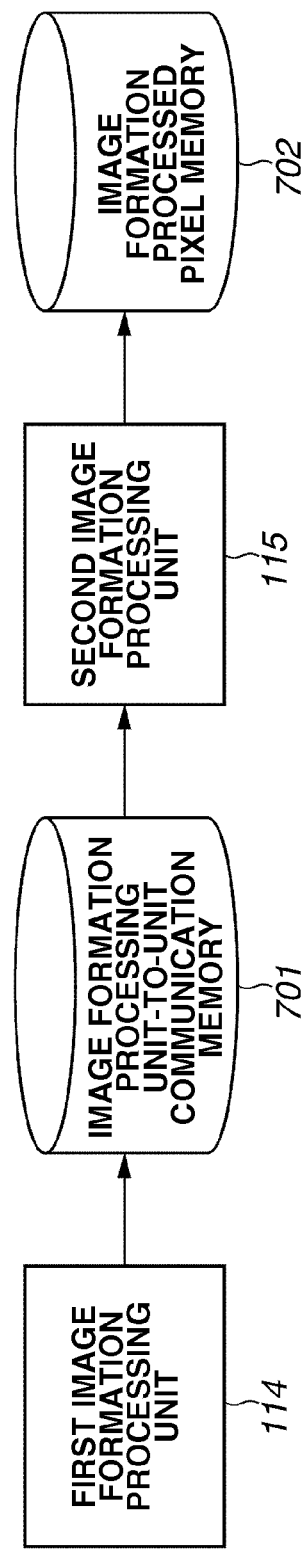
FIG. 7 is a block diagram illustrating an example relationship between a first image formation processing unit 114 and a second image formation processing unit 115 of the image formation processing apparatus 100 according to an exemplary embodiment of the present invention.

FIG. 7 is a block diagram illustrating an example relationship between the first image formation processing unit 114 and the second image formation processing unit 115, which are included in the image formation processing apparatus 100 according to the present exemplary embodiment.

The first image formation processing unit 114 performs the above-described pixel generation processing 321 and generates pixel data of respective objects included in closed areas. Then, the first image formation processing unit 114 transfers the generated pixel data to an image formation processing unit-to-unit communication memory 701. The image formation processing unit-to-unit communication memory 701 sends the received pixel data to the second image formation processing unit 115. Further, the first image formation processing unit 114 transfers control information to the second image formation processing unit 115 via the image formation processing unit-to-unit communication memory 701.

Although described later, the first image formation processing unit 114 transfers control information that instructs the second image formation processing unit 115 to perform processing load distribution and the pixel offset 317 indicating the place of acquired pixel data via the image formation processing unit-to-unit communication memory 701.

Next, the second image formation processing unit 115 performs the above-described pixel composition processing 322. Although described in detail below, if the processing load distribution is instructed, the second image formation processing unit 115 performs the pixel data acquisition processing 314 according to the pixel offset 317 notified from the first image formation processing unit 114.

When the above-described processing has been completed, the second image formation processing unit 115 performs processing for rasterizing the pixel data generated in an image formation processed pixel memory 702. Processing according to the present exemplary embodiment is described in detail below with reference to attached flowcharts.

Figure 8:
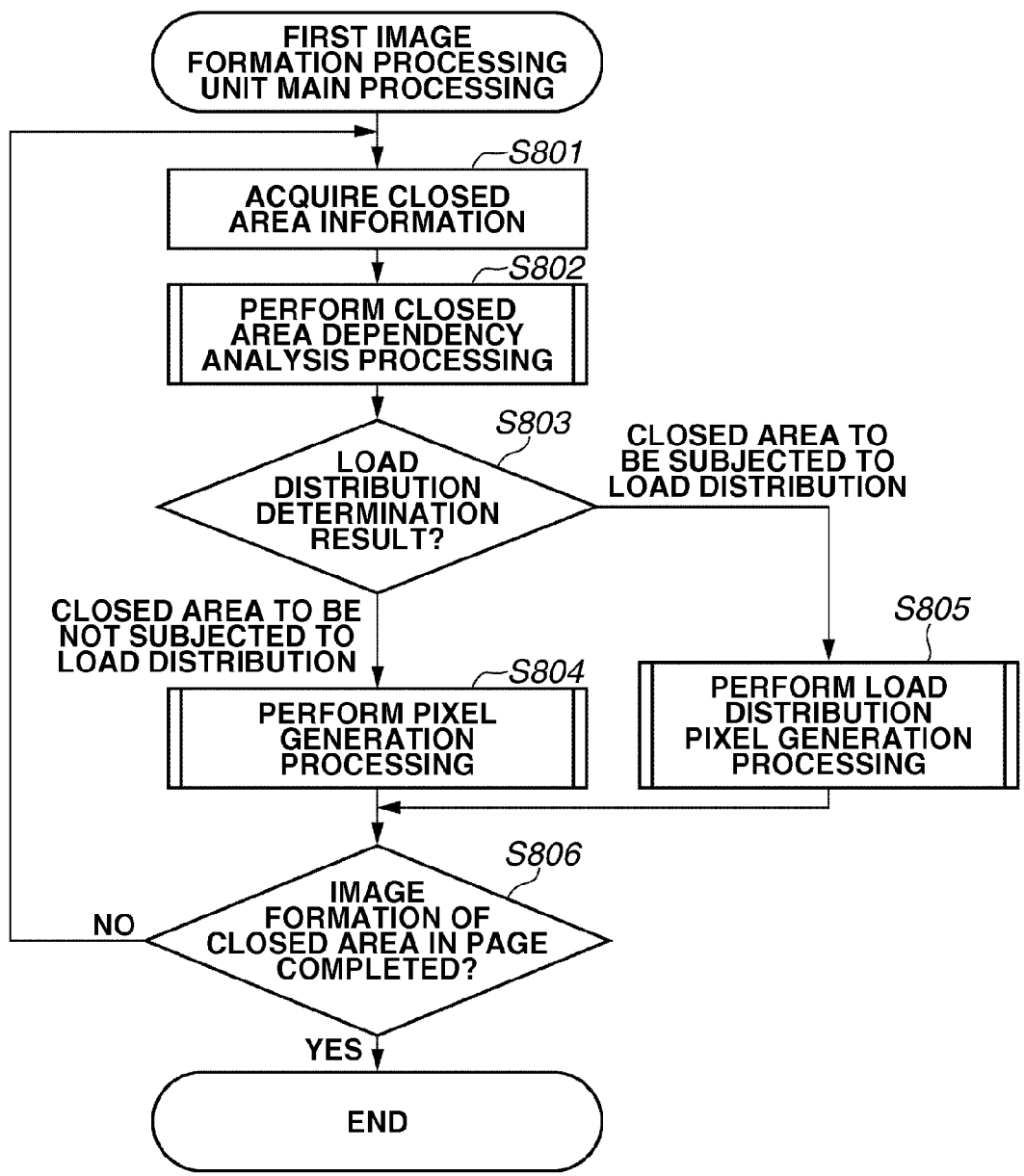
FIG. 8 is a flowchart illustrating image formation processing that can be performed by the first image formation processing unit 114 in response to an image formation processing instruction for a page image designated by a CPU 111 according to an exemplary embodiment of the present invention.

FIG. 8 is a flowchart illustrating image formation processing that is performed by the first image formation processing unit 114 in response to an image formation processing instruction for a page image designated by the CPU 111 according to the present exemplary embodiment.

First, in step S801, the first image formation processing unit 114 performs processing for acquiring closed area information designated in the image formation processing instruction. For example, the closed area information includes an area including the page 200 and the image object 202 if the processing target area is the closed area "1." Further, the closed area information includes the number of objects (e.g., two according to the illustrated example), area length information of the closed area "1", and object type information indicating the type of the object.

Next, in step S802, the first image formation processing unit 114 performs closed area dependency analysis processing to analyze the dependency of an object included in the closed area with reference to the closed area information acquired in step S801. Although described in detail below, the first image formation processing unit 114 acquires the dependency of the closed area by analyzing the number of objects or the type of each object included in the closed area. Then, the first image formation processing unit 114 analyses the load in the composition processing based on the acquired dependency and determines whether to distribute a part of the pixel generation processing 321 to the second image formation processing unit 115.

For example, the part of the processing to be subjected to the load distribution is the pixel data acquisition processing 314 or the attribute pixel acquisition processing. Next, in step S803, the first image formation processing unit 114 switches the processing based on the analysis information obtained in step S802 that indicates whether the processing target area is a closed area to be subjected to the load distribution. If the processing target area is not the closed area to be subjected to the load distribution, the operation proceeds to step S804. If the processing target area is a closed area to be subjected to the load distribution, the operation proceeds to step S805. More specifically, if in step S803 it is determined that the processing target area is not the closed area to be subjected to the load distribution, then in step S804, the first image formation processing unit 114 performs processing for generating pixel data of each object in the page image.

Details will be described below. If it is determined in step S803 that the processing target area is a closed area to be subjected to the load distribution, then in step 805, the first image formation processing unit 114 distributes a part of the pixel generation processing 321 to the second image formation processing unit 115. Then, the first image formation processing unit 114 performs processing for sending a notification including a load distribution request and the remaining part of the pixel generation processing 321 to the second image formation processing unit 115.

As described above, the part of the processing to be subjected to the load distribution is the pixel data acquisition processing 314 or the attribute pixel acquisition processing. Details will be described below. Next, in step S806, the first image formation processing unit 114 determines whether the above-described image formation processing has been completed for all closed areas in the page. If it is determined that the image formation processing has been thoroughly completed for all closed areas (YES in step S806), the first image formation processing unit 114 terminates the main processing illustrated in FIG. 8. If it is determined that the above-described image formation processing is not yet completed (NO in step S806), the operation returns to step S801, the first image formation processing unit 114 continuously performs the image formation processing for a closed area that is not yet subjected to the above-described image formation processing.

Figure 9:
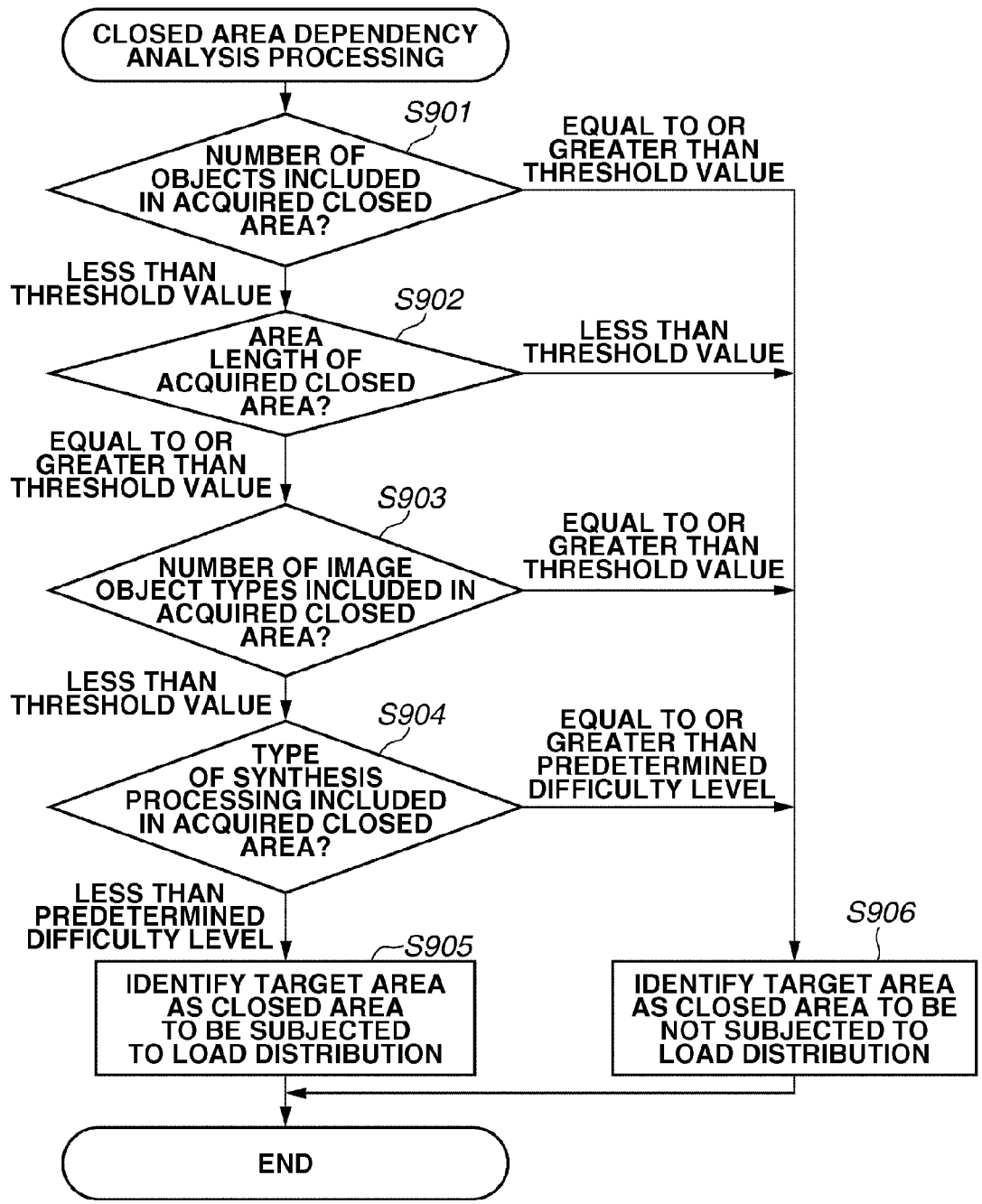
FIG. 9 is a flowchart illustrating details of closed area dependency analysis processing (to be performed in step S802) according to an exemplary embodiment of the present invention.

FIG. 9 is a flowchart illustrating details of the closed area dependency analysis processing (see step S802) illustrated in FIG. 8 according to the present exemplary embodiment.

First, the first image formation processing unit 114 performs processing for analyzing the number of objects included in a closed area acquired from the closed area information acquired in step S801. Then, in step S901, the first image formation processing unit 114 determines whether the number of objects included in the acquired closed area is equal to or greater than a predetermined threshold value.

If it is determined that the number of objects included in the acquired closed area is equal to or greater than the threshold value, the operation proceeds to step S906. If it is determined that the number of objects included in the acquired closed area is less than the threshold value, the operation proceeds to step S902. The threshold value to be compared with the number of objects in step 901 can be freely set by the image formation processing apparatus. For example, the threshold value can be set to 2 (corresponding to a state where there is not any overlapped object) or an arbitrary value that is greater than 2.

Next, in step S902, the first image formation processing unit 114 analyzes the area length of the acquired closed area. If it is determined that the area length is equal to or greater than a threshold value, the operation proceeds to step S903. If it is determined that the area length is less than the threshold value, the operation proceeds to step S906. Next, in step S903, the first image formation processing unit 114 analyzes the number of a predetermined type of objects included in the acquired closed area. In the present exemplary embodiment, the predetermined type is "image", although each object in the closed area can be classified into one of image, character, graphics, and line. If it is determined that the number of the image objects is less than a threshold value, the operation proceeds to step S904. If it is determined that the number of the image objects is equal to or greater than the threshold value, the operation proceeds to step S906.

In step S904, the first image formation processing unit 114 determines whether the type of the composition processing included in the acquired closed area is equal to or greater than a predetermined difficulty level. The type of the composition processing is, for example, raster operation (ROP) processing or permeabilization processing (e.g., each rule of PorterDuff, PS, and PDF). For example, the ROP processing mainly includes four arithmetic operations. Therefore, the first image formation processing unit 114 determines the ROP processing is easy to perform. As a result, the operation proceeds to step S905.

Further, if the designated composition processing is the permeabilization processing, the processing tends to become heavier because of difficult multiplication and division calculations. As a result, the operation proceeds to step S906. Next, in step S905, the first image formation processing unit 114 determines that the closed area acquired in step S801 is a closed area to be subjected to the load distribution. The first image formation processing unit 114 adds flag information including the determination result, which can be referred to in the subsequent processing.

When the operation proceeds to step S905, it means that the number of objects in the closed area is less than the threshold value. In this case, the load of the composition processing to be performed by the second image formation processing unit 115 is less than a predetermined threshold value. Accordingly, the first image formation processing unit 114 determines that the processing target area is a closed area to be subjected to the load distribution.

Further, when the operation proceeds to step S905, it means that the area length of the closed area is large. The pixel generation processing 321 to be performed by the first image formation processing unit 114 tends to become relatively greater. Accordingly, the first image formation processing unit 114 determines that executing the load distribution brings an effect of balancing the processing to be performed by the first image formation processing unit 114 with the processing to be performed by the second image formation processing unit 115.

Next, in step S906, the first image formation processing unit 114 determines that the closed area acquired in step S801 is a closed area to be not subjected to the load distribution. The first image formation processing unit 114 adds flag information including the determination result, which can be referred to in the subsequent processing. When the operation proceeds to step S906, it means that the number of objects in the closed area is equal to or greater than the threshold value. In this case, the load of the composition processing to be performed by the second image formation processing unit 115 is equal to or greater than the predetermined threshold value. Accordingly, the first image formation processing unit 114 determines that the processing target area is a closed area to be not subjected to the load distribution.

Further, when the operation proceeds to step S905, it means that the area length of the closed area is short. Accordingly, the pixel generation processing 321 to be performed by the first image formation processing unit 114 tends to become relatively smaller. Accordingly, the first image formation processing unit 114 determines that executing the load distribution cannot bring an effect of reducing the processing time. Accordingly, the first image formation processing unit 114 determines that the processing target area is a closed area to be not subjected to the load distribution. In the present exemplary embodiment, the order of the above-described determination steps S901 to 904 processing can be freely changed.

Figure 10:
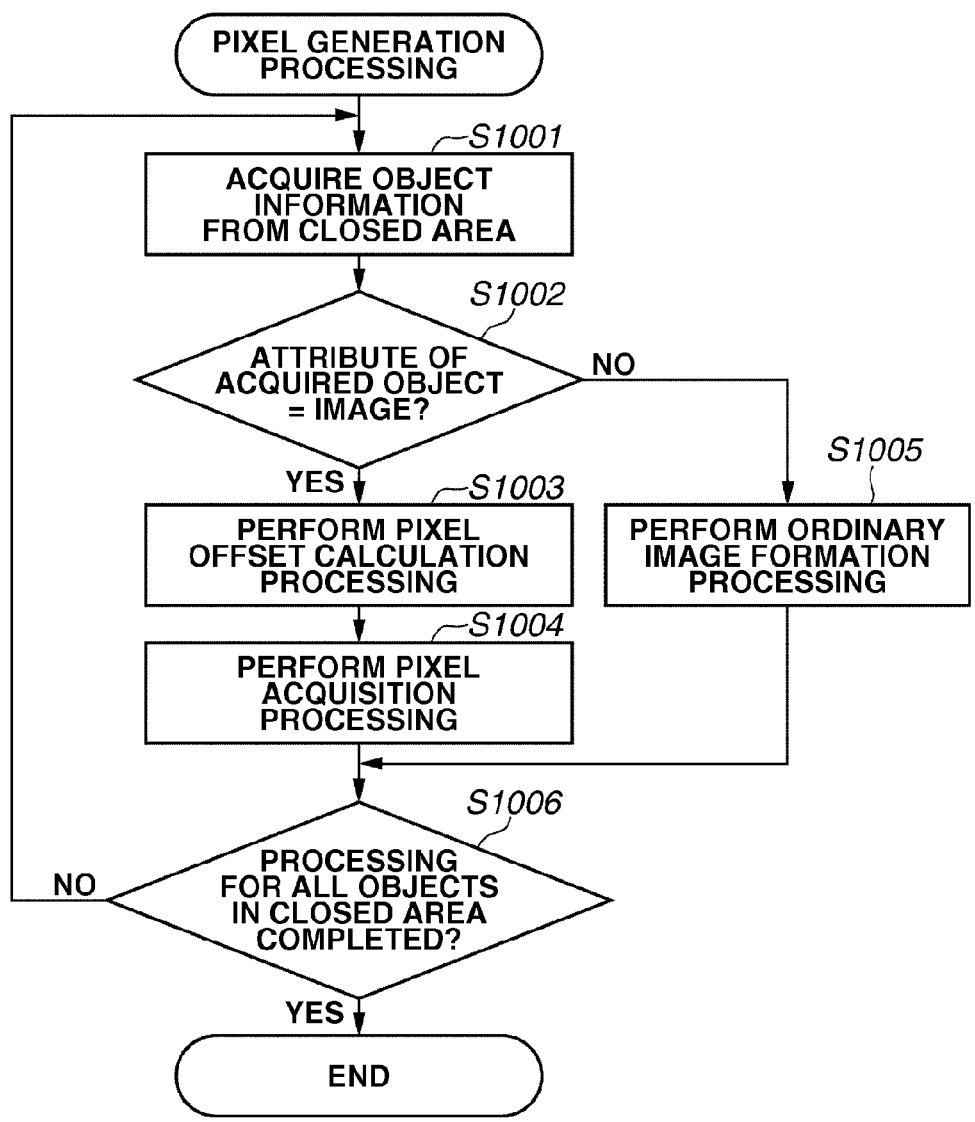
FIG. 10 is a flowchart illustrating details of pixel generation processing (to be performed in step S804) according to an exemplary embodiment of the present invention.

FIG. 10 is a flowchart illustrating details of the pixel generation processing in step S804 illustrated in FIG. 8 according to the present exemplary embodiment.

First, in step S1001, the first image formation processing unit 114 performs processing for acquiring object information from the closed area to be subjected to the image formation processing. Next, in step S1002, the first image formation processing unit 114 determines whether the attribute of the object acquired in step S1001 is image. If it is determined that the attribute of the acquired object is image (YES in step S1002), the operation proceeds to step S1003. If it is determined that the attribute of the acquired object is not image (NO in step S1002), the operation proceeds to step S1005.

Next, when the operation proceeds to step S1003, the first image formation processing unit 114 performs affine transformation processing including designated enlargement/reduction, rotation, and modification processing. The first image formation processing unit 114 performs processing for acquiring the pixel offset 317 to be acquired from the memory (see 313 illustrated in FIG. 3). The affine transformation processing to be performed in step S1003 is a well-known technique, so that it is not described in detail.

Figure 3:
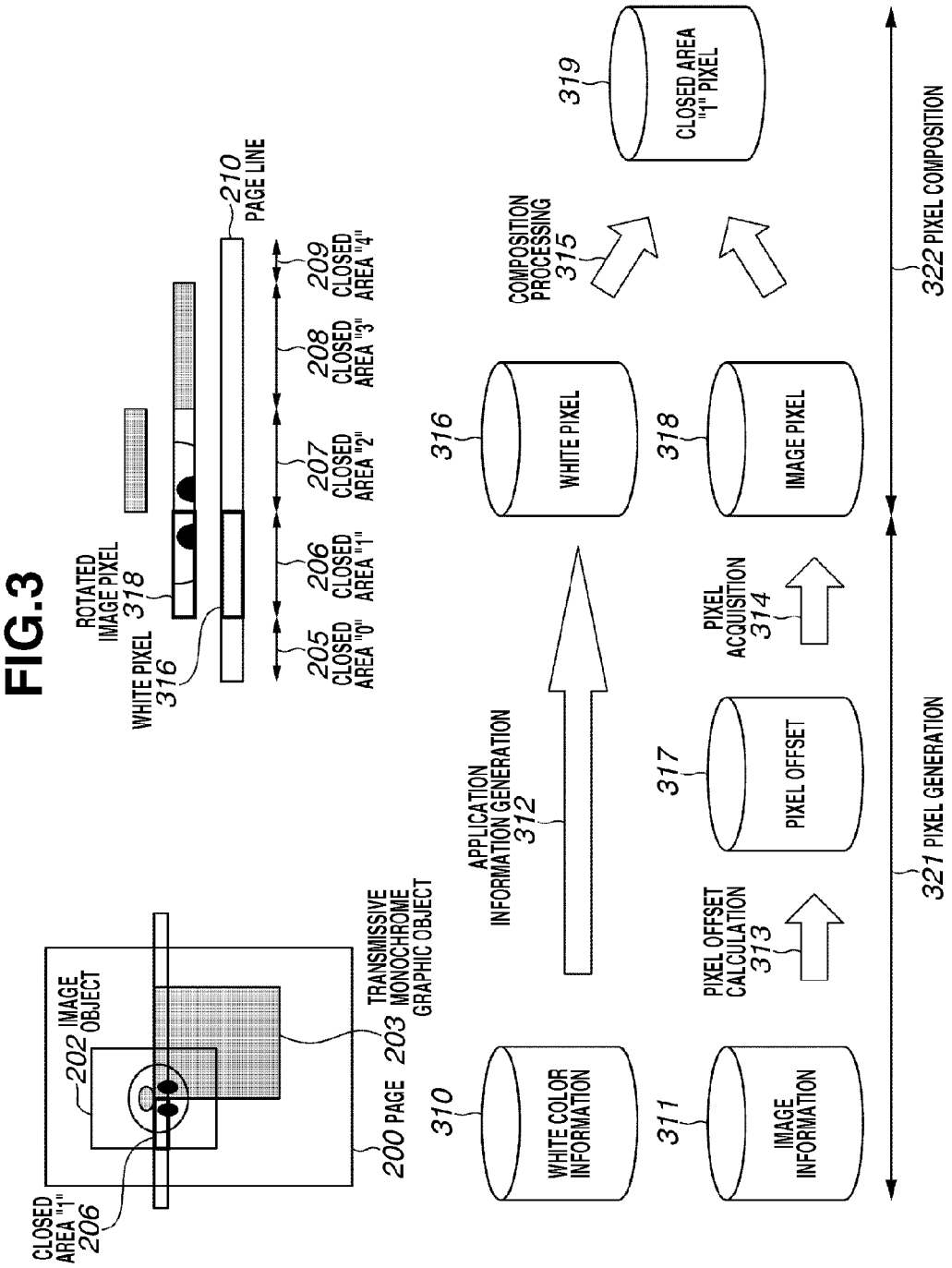
FIG. 3 illustrates an example of the scanline model image formation method, which includes image formation processing to be performed on a line-to-line basis, according to the present invention.
Figure 4:
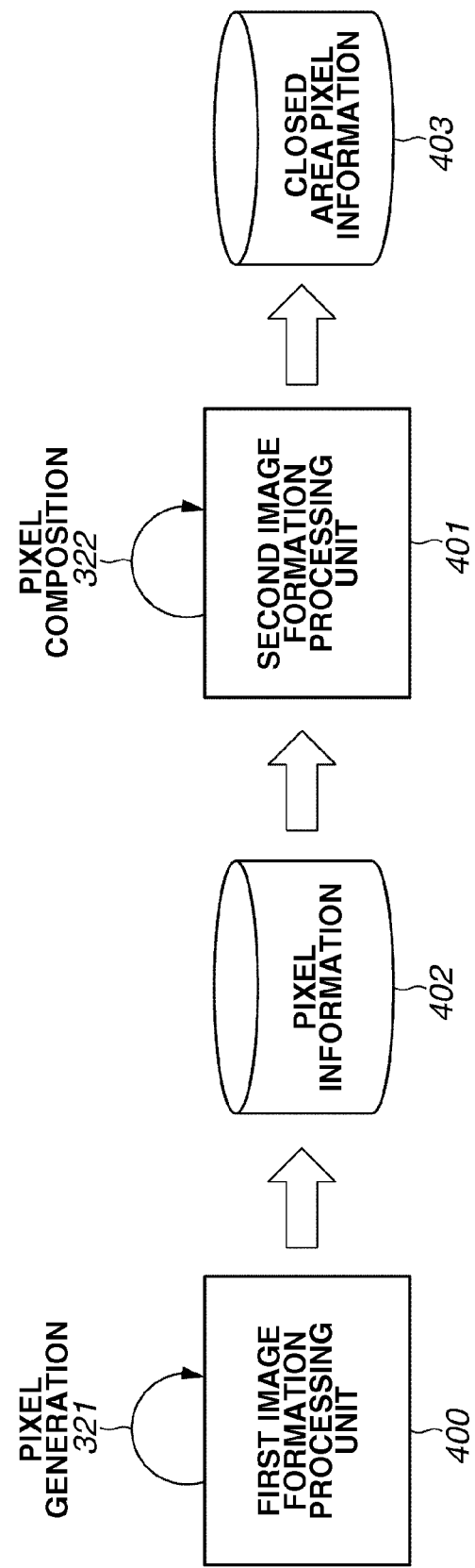
FIG. 4 illustrates an example relationship between a plurality of image formation processing units according to the present invention.
Figure 5:
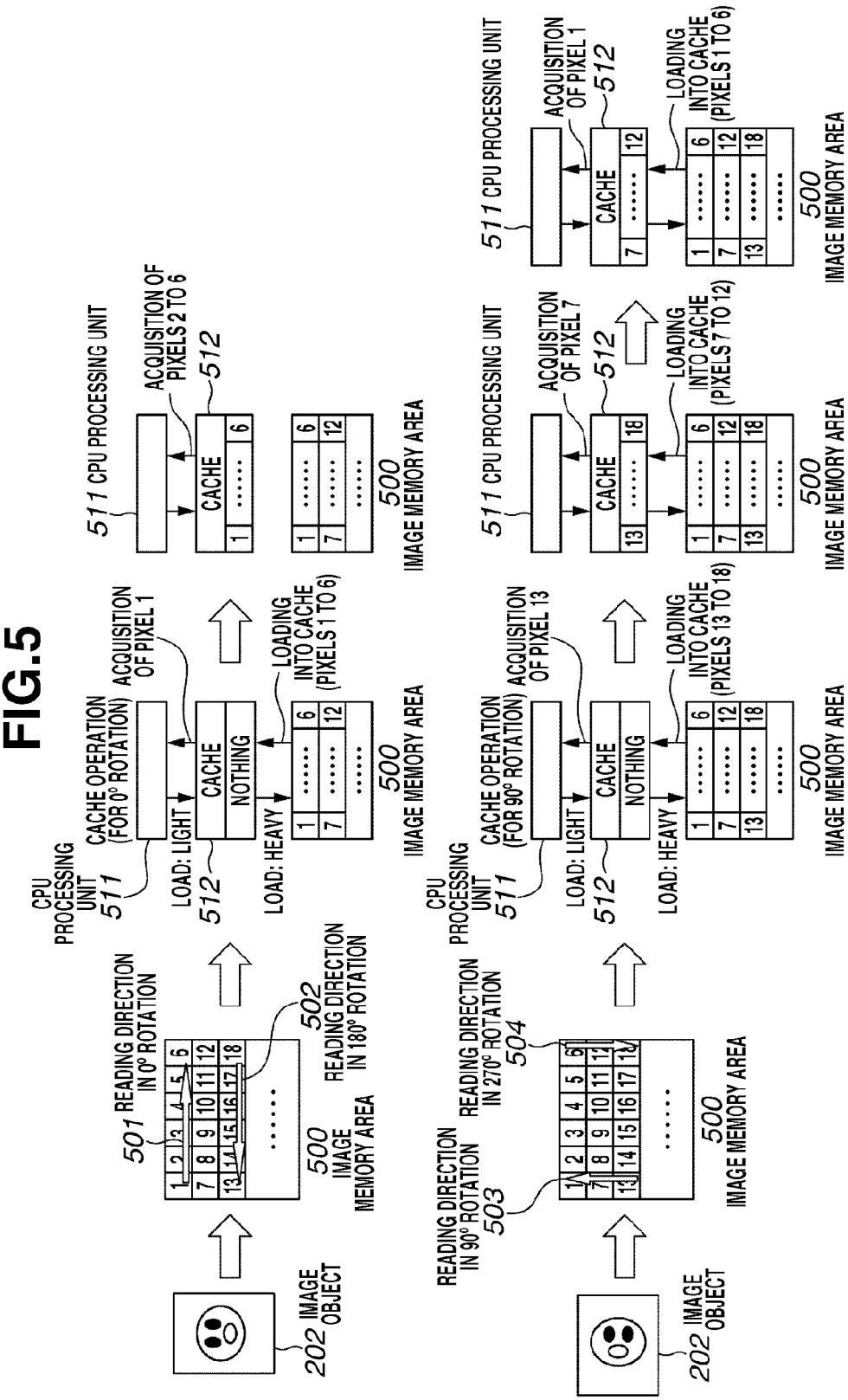
FIG. 5 illustrates an example of cache efficiency in pixel generation processing according to an exemplary embodiment of the present invention.

Next, in step S1004, the first image formation processing unit 114 performs processing for acquiring actual pixel data from the place indicated by the pixel offset 317 acquired in step S1003 (pixel acquisition 314 illustrated in FIG. 3). Next, when the operation proceeds to step S1005, the first image formation processing unit 114 performs processing for generating pixel data of an object in the acquired closed area (pixel generation 321 illustrated in FIG. 3). The processing to be performed in step S1005 is ordinary pixel data generation processing, so that it is not described in detail.

Next, in step S1006, the first image formation processing unit 114 determines whether the above-described image formation processing has been completed for all objects included in the closed area information acquired in step S801. If it is determined that the image formation processing has been thoroughly completed for all objects (YES in step S1006), the first image formation processing unit 114 terminates the pixel generation processing of step S804. If it is determined that the image formation processing has not yet been thoroughly completed (NO in step S1006), the operation returns to step S1001. The first image formation processing unit 114 continuously performs the image formation processing for a closed area that is not yet subjected to the above-described image formation processing.

Figure 11:
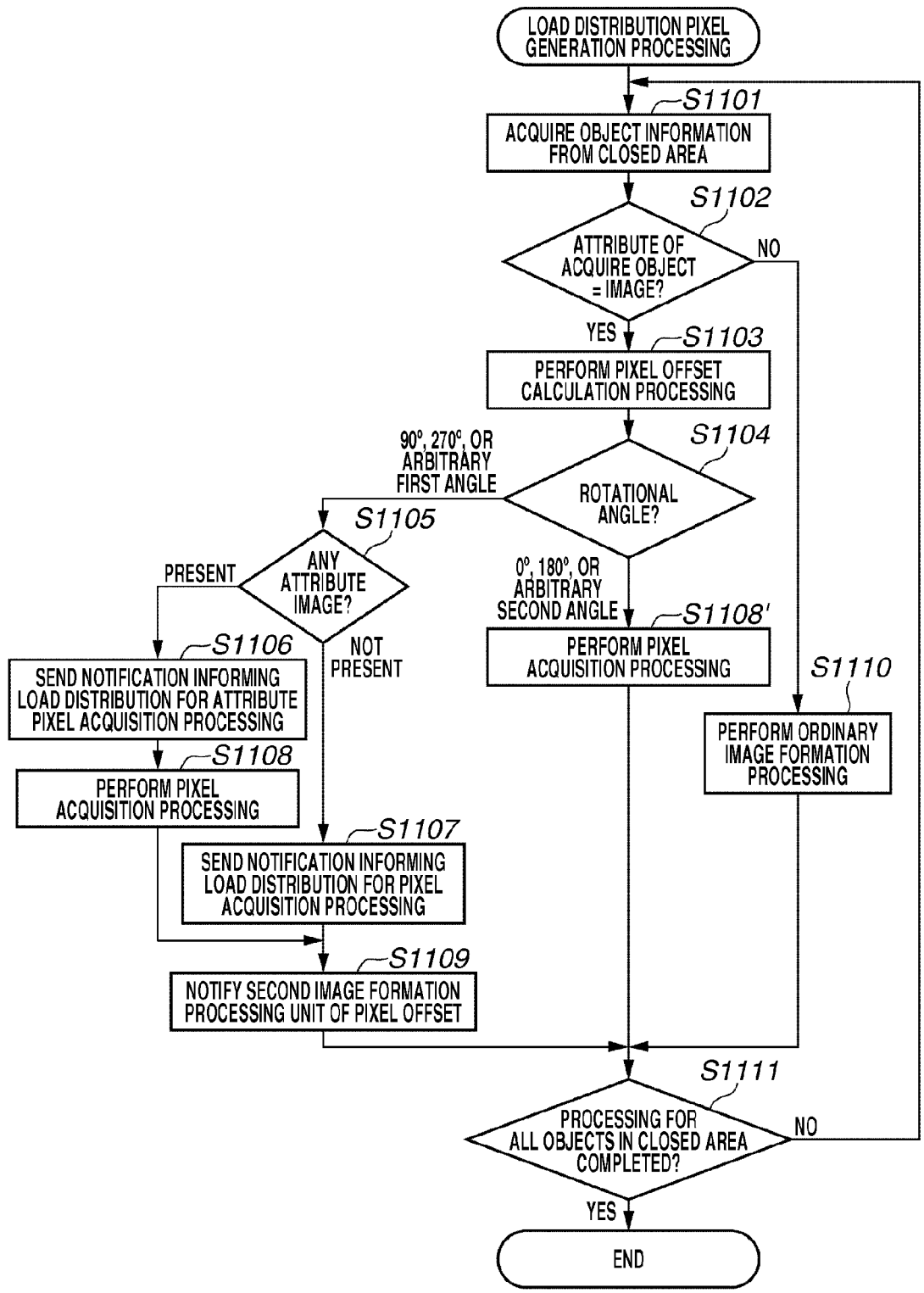
FIG. 11 is a flowchart illustrating details of load distribution pixel generation processing (to be performed in step S805) according to an exemplary embodiment of the present invention.

FIG. 11 is a flowchart illustrating details of the load distribution pixel generation processing to be performed in step S805 illustrated in FIG. 8 according to the present exemplary embodiment.

First, in step S1101, the first image formation processing unit 114 performs processing for acquiring object information from the closed area to be subjected to the image formation processing. Next, in step S1102, the first image formation processing unit 114 determines whether the attribute of the object acquired in step S1001 is image. If it is determined that the attribute is image (YES in step S1102), the operation proceeds to step S1103. If it is determined that the attribute is not image (NO in step S1102), the operation proceeds to step S1110.

When the operation proceeds to step S1103, the first image formation processing unit 114 performs affine transformation processing including designated enlargement/reduction, rotation, and modification processing. Then, in step S1103, the first image formation processing unit 114 performs processing for acquiring the offset 317 of the pixel data to be acquired from the memory. The processing to be performed in step S1103 is similar to the above-described processing performed in step S1003.

Next, in step S1104, the first image formation processing unit 114 performs rotational angle analysis processing for analyzing the rotational angle designated for the acquired image. If it is determined that the designated rotational angle is 90°, 270°, or an arbitrary first type angle, the operation proceeds to step S1105. If it is determined that the designated rotational angle is 0°, 180°, or an arbitrary second type angle, the operation proceeds to step S1108'. The processing performed in step S1108' is similar to the processing of the pixel acquisition processing performed in step S1108 (described below).

When the operation proceeds to step S1105, it means that the pixel data acquisition processing 314 tends to be heavy because the above-described cache cannot be efficiently used. Further, in this case, the first image formation processing unit 114 determines which processing of the pixel data acquisition processing 314 and the attribute pixel acquisition processing is to be subjected to the load distribution. The attribute pixel is information indicating previous attribute of each pixel.

If the object is PDL or ESC code, the attribute pixel holds information indicating attribute, such as character, graphics, or image, of the object. The attribute pixel indicating the previous attribute (e.g., character, graphics, or image) of the object can be generated and acquired after completing rasterizing PDL or ESC code into pixel data (bitmap image) and before rasterizing each pixel data. In other words, the attribute pixel is pixel information that can be acquired for each pixel even after completing rasterizing (converting) the original attribute (e.g., character, graphics, or image) of the object into pixel data.

Then, in step S1105, the first image formation processing unit 114 determines whether the processing target image is an attribute pixel holding image. The load distribution determination is differently performed depending on the determination result in step S1105. More specifically, if the attribute image is present, the operation proceeds to step S1106. If the attribute image is not present, the operation proceeds to step S1107. Next, when the operation proceeds to step S1106, the first image formation processing unit 114 performs processing for sending a notification informing the load distribution for the attribute pixel acquisition processing to the second image formation processing unit 115.

The notification processing includes adding a load distribution flag instructing the load distribution of the processed to be performed by the second image formation processing unit 115 and notifying the pixel offset 317, which is required in the attribute pixel acquisition processing, via the image formation processing unit-to-unit communication memory 701.

Next, in step S1108, the first image formation processing unit 114 performs the pixel data acquisition processing 314 based on the pixel offset 317. When the operation proceeds to step S1107, the first image formation processing unit 114 performs processing for sending a notification informing the load distribution for the pixel data acquisition processing 314 to the second image formation processing unit 115.

The notification processing includes adding the load distribution flag instructing the load distribution of the processed to be performed by the second image formation processing unit 115 and notifying the pixel offset 317, which is required in the pixel data acquisition processing 314, via the image formation processing unit-to-unit communication memory 701.

Next, when the operation proceeds to step S1108, the first image formation processing unit 114 determines that there is not any tendency that the pixel loading processing becomes heavier. Accordingly, similar to the pixel generation processing performed in step S804, the first image formation processing unit 114 performs pixel offset acquisition processing (see pixel offset calculation 313 illustrated in FIG. 3) and performs the pixel data acquisition processing (see pixel acquisition 314 illustrated in FIG. 3) based on the value of the pixel offset 317.

Next, when the operation proceeds to step S1110, the first image formation processing unit 114 performs processing for generating pixel data of the object in the acquired closed area (see pixel generation 321 illustrated in FIG. 3). The processing to be performed in step S1110 is ordinary pixel data generation processing, so that it is not described in detail.

Next, in step S1111, the first image formation processing unit 114 determines whether the image formation processing has been completed for all objects included in the closed area information acquired in step S801. If it is determined that the image formation processing has been completed for all objects (YES in step S1111), the first image formation processing unit 114 terminates the load distribution pixel generation processing to be performed in step S805. If it is determined that the image formation processing for all objects has not yet been thoroughly completed (NO in step S1111), the operation returns to step S1101. The first image formation processing unit 114 continuously performs the image formation processing for a closed area that is not yet subjected to the above-described image formation processing.

Figure 12:
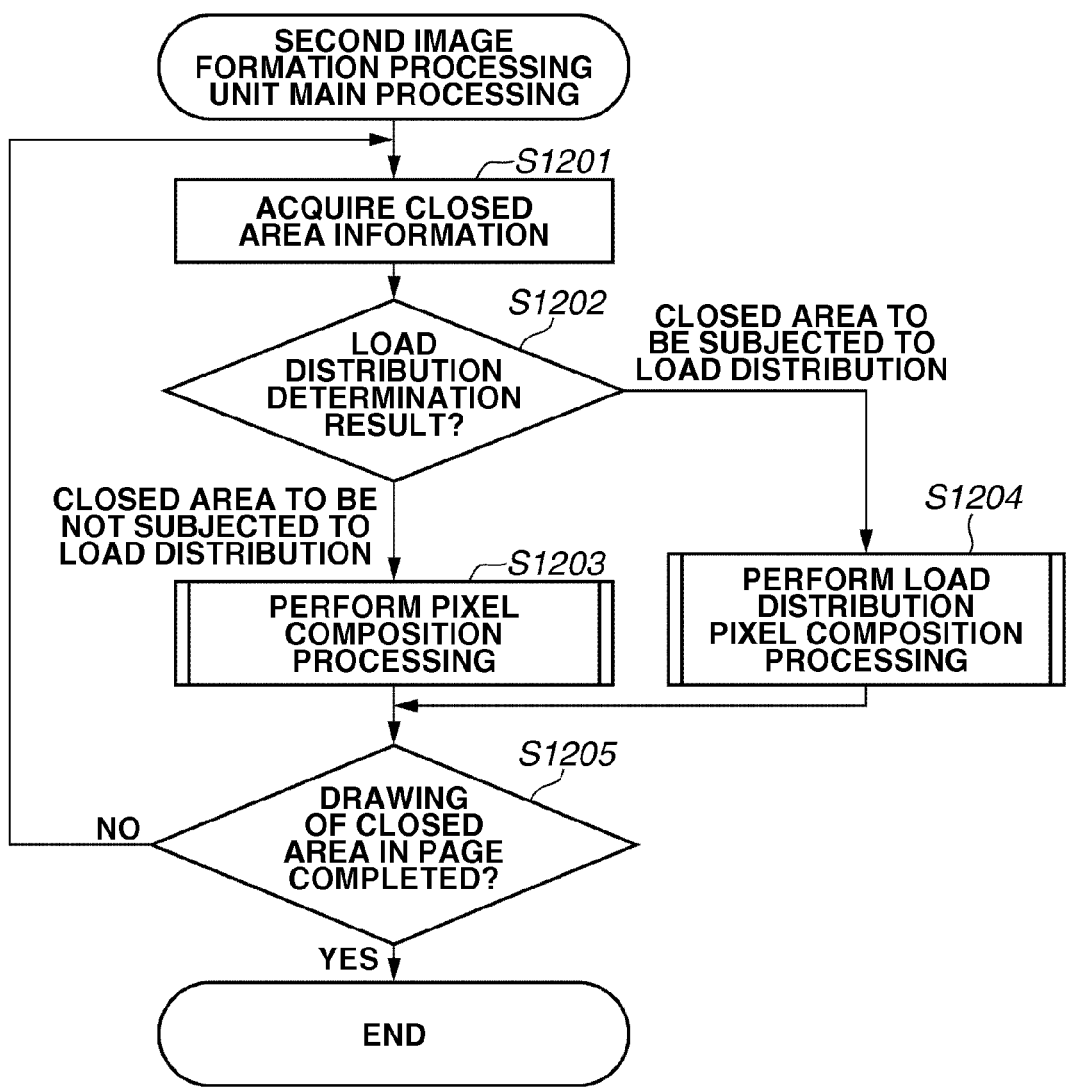
FIG. 12 is a flowchart illustrating image formation processing performed by the second image formation processing unit 115, which corresponds to image formation processing designated by the first image formation processing unit 114, according to an exemplary embodiment of the present invention.

FIG. 12 is a flowchart illustrating image formation processing that can be performed by the second image formation processing unit 115, which corresponds to the image formation processing designated by the first image formation processing unit 114, according to the present exemplary embodiment.

First, in step S1201, the second image formation processing unit 115 performs processing for acquiring the closed area information from the first image formation processing unit 114. Next, in step S1202, the second image formation processing unit 115 determines whether the load distribution flag is added, namely determines whether the first image formation processing unit 114 has instructed the load distribution for the pixel generation processing.

If it is determined that the processing target area is a closed area to be not subjected to the load distribution, the operation proceeds to step S1203. If it is determined that the processing target area is a closed area to be subjected to the load distribution, the operation proceeds to step S1204. Next, if in step S1202 it is determined that the processing target area is a closed area to be not subjected to the load distribution, then in step S1203, the second image formation processing unit 115 performs pixel data composition processing for each object. Details will be described below.

Next, if in step S1202 it is determined that the processing target area is a closed area to be subjected to the load distribution, the second image formation processing unit 115 determines that there is the possibility that it is necessary to perform a part of the pixel generation processing 321 for the processing target closed area. Then, in step S1204, the second image formation processing unit 115 performs processing for combining pixel data of respective objects and performs processing for acquiring pixel data of the load distribution target object. Details will be described below.

Next, in step S1205, the second image formation processing unit 115 determines whether the image formation processing for the closed area in the page has been thoroughly completed. If it is determined that the image formation processing has been thoroughly completed (YES in step S1205), the second image formation processing unit 115 terminates the second image formation processing unit main processing. If it is determined that the image formation processing has not yet been completed (NO in step S1205), the operation returns to step S1201. The second image formation processing unit 115 continuously performs the image formation processing for a closed area that is not yet subjected to the above-described image formation processing.

Figure 13:
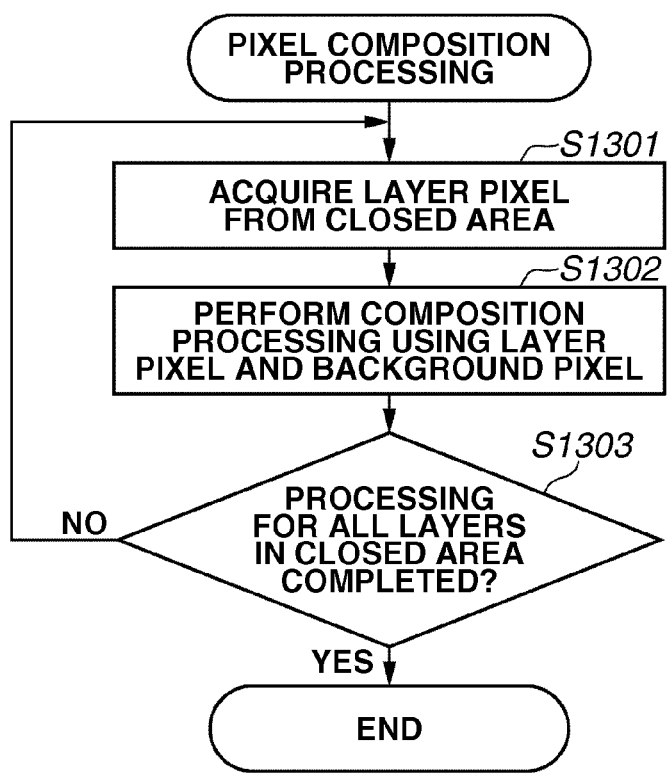
FIG. 13 is a flowchart illustrating details of pixel composition processing (step S1204) according to an exemplary embodiment of the present invention.

FIG. 13 is a flowchart illustrating details of the pixel composition processing performed in step S1204 illustrated in FIG. 12 according to the present exemplary embodiment.

First, in step S1301, the second image formation processing unit 115 performs processing for acquiring pixel data of an object in the closed area generated by the first image formation processing unit 114. The pixel data acquired in the step S1301 includes the pixel data 316 or the image pixel 318, which can be received from the first image formation processing unit 114 via the image formation processing unit-to-unit communication memory 701.

Figure 6:
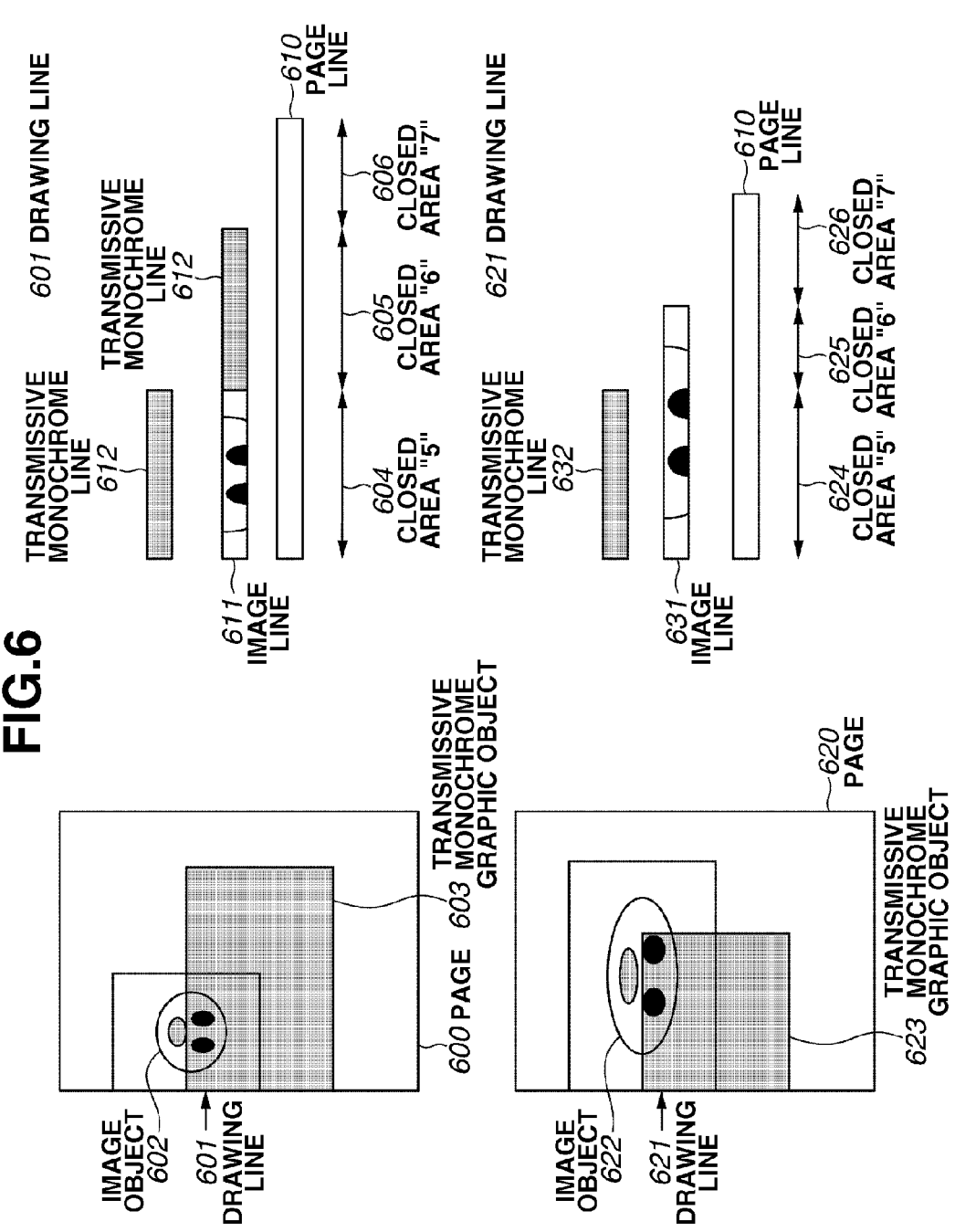
FIG. 6 illustrates a problem in load distribution performed in the scanline model image formation processing according to an exemplary embodiment of the present invention.

Next, in step S1302, the second image formation processing unit 115 acquires the background pixel data of the target closed area that is currently subjected to the image formation processing. Then, the second image formation processing unit 115 performs composition processing using the acquired background pixel data and the pixel data acquired in step S1301. For example, according to the example illustrated in FIG. 6, if the composition processing target is the transmissive monochrome potion of the closed area "5" 604, the second image formation processing unit 115 performs composition processing by combining a composition result obtainable from the previous composition processed page line 610 and the image line 611 with the transmissive monochrome line 612 acquired in step S1301.

Next, in step S1303, the second image formation processing unit 115 determines whether the above-described processing has been completed for all objects in the closed area. If it is determined that the above-described processing has been completed thoroughly (YES in step S1303), the second image formation processing unit 115 terminates the pixel composition processing to be processed in step S1204. If it is determined that the above-described processing has not yet been completed (NO in step S1303), the operation returns to S1301. The second image formation processing unit 115 continuously performs the image formation processing for an object that is not yet subjected to the above-described image formation processing.

Figure 14:
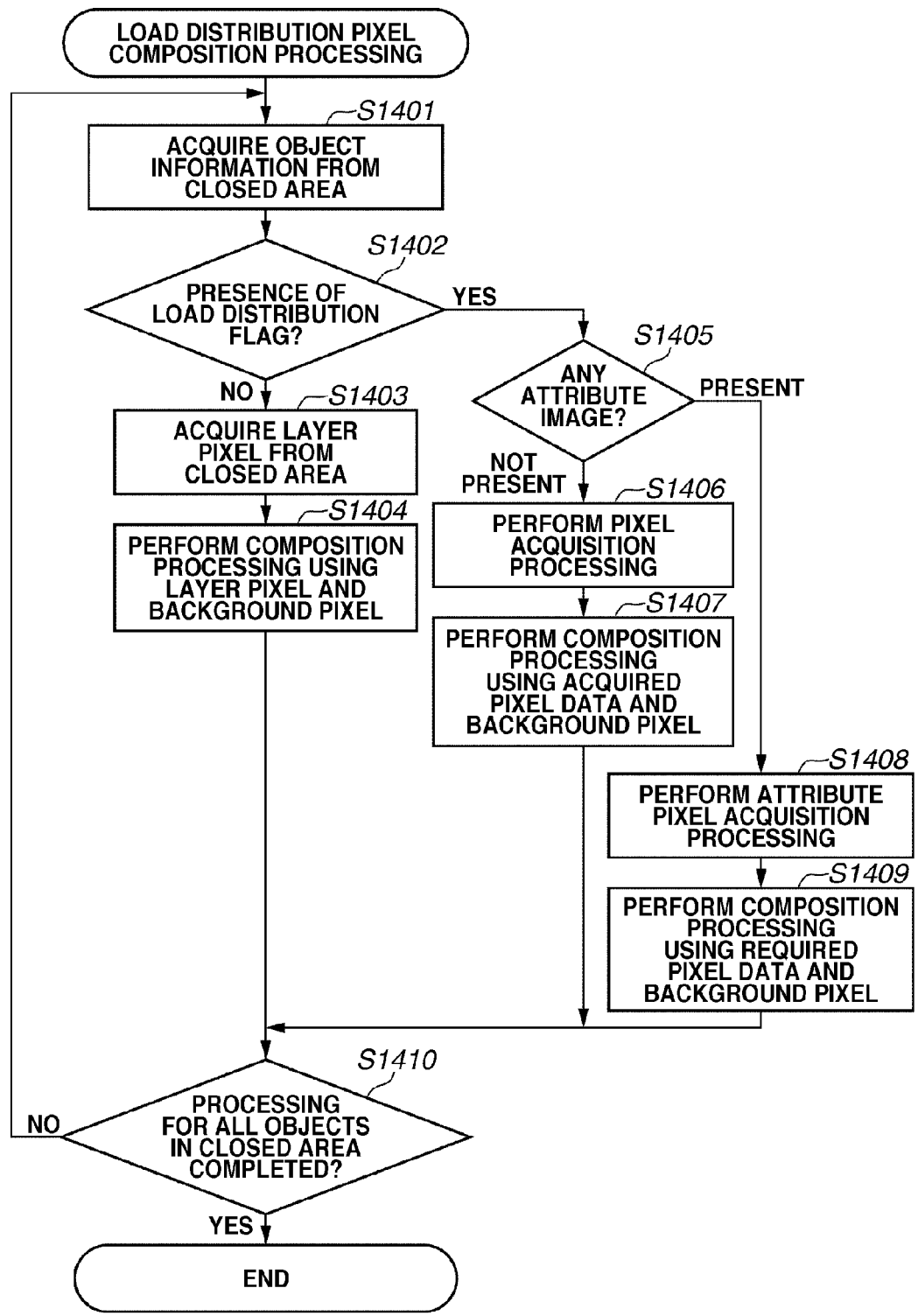
FIG. 14 is a flowchart illustrating details of load distribution pixel composition processing (to be performed in step S1205) according to an exemplary embodiment of the present invention.

FIG. 14 is a flowchart illustrating details of the load distribution pixel composition processing performed in step S1205 illustrated in FIG. 12 according to the present exemplary embodiment.

First, in step S1401, the second image formation processing unit 115 performs processing for acquiring the closed area object information, which has been generated by the first image formation processing unit 114, from the image formation processing unit-to-unit communication memory 701. Next, in step S1402, the second image formation processing unit 115 performs processing for recognizing the presence of the load distribution flag with reference to the object information acquired in step S1401. If it is determined that the load distribution flag is present (YES in step S1402), the operation proceeds to step S1405. If it is determined that the load distribution flag is not present (NO in step S1402), the operation proceeds to step S1403.

When the operation proceeds to step S1403, the second image formation processing unit 115 performs processing for acquiring pixel data of an object in the closed area generated by the first image formation processing unit 114 (see pixel acquisition 314 illustrated in FIG. 3).

Then, in step S1404, the second image formation processing unit 115 acquires the background pixel data of the target closed area that is currently subjected to the image formation processing. Then, the second image formation processing unit 115 performs composition processing using the acquired background pixel data and the pixel data acquired in step S1403. For example, according to the example illustrated in FIG. 6, if the composition processing target is the transmissive monochrome portion of the closed area "5" 604, the second image formation processing unit 115 performs composition processing by combining a composition result obtainable from the previous composition processed page line 610 and the image line 611 with the transmissive monochrome line 612 acquired in step S1301.

When the operation proceeds to step S1405, the second image formation processing unit 115 determines whether the processing target object is an attribute image. If there is not any attribute image, the operation proceeds to step S1406. If the presence of an attribute image is confirmed, the operation proceeds to step S1408.

Next, when the operation proceeds to step S1406, the second image formation processing unit 115 performs processing for acquiring pixel data from the place indicated by the acquired pixel offset 317 acquired from the first image formation processing unit 114 (see pixel acquisition 314 illustrated in FIG. 3). Next, in step S1407, the second image formation processing unit 115 acquires the background pixel data of the target closed area that is currently subjected to the image formation processing. Then, the second image formation processing unit 115 performs composition processing using the acquired background pixel data and the pixel data acquired in step S1406.

Next, when the operation proceeds to step S1408, the second image formation processing unit 115 performs processing for acquiring attribute pixel data from the place indicated by the acquired pixel offset 317. Then, in step S1409, the second image formation processing unit 115 acquires the background pixel data and performs composition processing using the pixel data acquired in step S1408, the pixel data acquired by the first image formation processing unit 114, and the background pixel data.

Next, in step S1410, the second image formation processing unit 115 determines whether the above-described processing has been completed for all objects in the closed area. If it is determined that the above-described processing has been completed for all objects (YES in step S1410), the second image formation processing unit 115 terminates the load distribution pixel composition processing (to be performed step S1205). If it is determined that the above-described processing has not yet been thoroughly completed (NO in step S1410), the operation returns to step S1401. The second image formation processing unit 115 continuously performs the image formation processing for an object in the closed area that is not yet subjected to the image formation processing.

Further, a second exemplary embodiment according to the present invention is described in detail below. The second exemplary embodiment and the above-described first exemplary embodiment are substantially similar to each other in configuration. The processing according to the above-described first exemplary embodiment includes determining whether to perform the predetermined load distribution processing based on the dependency and rotational angle information. On the other hand, the processing according to the second exemplary embodiment includes calculating a total load value of a plurality of image formation processing units based on the dependency and rotational angle information and performing load distribution processing based on the calculated total load value. Accordingly, the second exemplary embodiment is different from the first exemplary embodiment only in the closed area dependency analysis processing (to be performed in step S802) and the load distribution pixel generation processing (to be performed in step S805), as described in detail below.

FIG. 15 is a flowchart illustrating details of the closed area dependency analysis processing in step S802 according to the second exemplary embodiment.

First, the first image formation processing unit 114 performs processing for analyzing the number of objects included in the closed area acquired from the closed area information, which has been acquired in step S801, and calculating a composition processing load value based on the number of objects. For example, the load value of each object can be stored beforehand with reference to the type of the object. Thus, the first image formation processing unit 114 can calculate the composition processing load value with reference to the load values stored beforehand.

Then, in step S1501, the first image formation processing unit 114 adds the calculated composition processing load value to a total load value stored in the second image formation processing unit 115. Next, the first image formation processing unit 114 performs processing for analyzing the area length included in the closed area acquired from the closed area information acquired in step S801. The first image formation processing unit 114 calculates a composition processing load value based on the analyzed area length. Similar to step S1501, the load value of each pixel can be stored beforehand. Thus, the first image formation processing unit 114 can calculate the composition processing load value with reference to the area length.

Then, in step S1502, the first image formation processing unit 114 adds the calculated composition processing load value to the total load value stored in the second image formation processing unit 115. Next, the first image formation processing unit 114 performs processing for analyzing the number of image objects included in the closed area acquired from the closed area information acquired in step S801 and calculates the composition processing load value based on the analyzed number of image types. Similar to step S1501, the first image formation processing unit 114 can calculate the composition processing load value according to the number of image types with reference to the load value stored beforehand.

Then, in step S1503, the first image formation processing unit 114 adds the calculated composition processing load value to the total load value stored in the second image formation processing unit 115. Next, the first image formation processing unit 114 performs processing for analyzing the type of the composition processing included in the closed area acquired from the closed area information acquired in step S801 and calculates the composition processing load value based on the analyzed composition type.

Similar to step S1501, the first image formation processing unit 114 can calculate the composition processing load value according to the type of the composition processing with reference to the load value stored beforehand. Then, in step S1504, the first image formation processing unit 114 adds the calculated composition processing load value to the total load value stored in the second image formation processing unit 115.

FIG. 16 is a flowchart illustrating details of the load distribution pixel generation processing to be performed in step S805 illustrated in FIG. 8 according to the second exemplary embodiment. FIG. 16 includes processing steps similar to those illustrated in FIG. 11. Therefore, only the processing steps that are not included in FIG. 11 are described in detail below.

First, if it is determined that the attribute of the acquired object is image (YES in step S1102), the operation proceeds to step S1103. Then, in step S1103, the first image formation processing unit 114 performs processing for calculating the pixel offset. Then, the processing proceeds to step S1104.

Next, the first image formation processing unit 114 acquires rotational angle information designated for the image from the object information acquired in step S1101. Then, the first image formation processing unit 114 calculates a load value required to perform the pixel generation processing based on the acquired rotational angle. Similar to step S1501, the first image formation processing unit 114 can calculate the processing load value according to the rotational angle with reference to the load value stored beforehand.

Then, in step S1601, the first image formation processing unit 114 adds the calculated load value to a total load value stored in the first image formation processing unit 114. Next, in step S1602, the second image formation processing unit 115 compares the calculated load value of the first image formation processing unit with the calculated load value of the second image formation processing unit. If the load value of the first image formation processing unit is greater than the load value of the second image formation processing unit (YES in step S1602), the system performs processing for distributing a part of the pixel acquisition processing to the second image formation processing unit 115. Accordingly, the operation proceeds to step S1105.

Further, if the load value of the first image formation processing unit 114 is not greater than the load value of the second image formation processing unit (NO in step S1602), the system does not distribute any part of the pixel acquisition processing to the second image formation processing unit 115. Accordingly, the operation proceeds to step S1108. Subsequently, the system performs processing similar to that described with reference to the flowchart illustrated in FIG. 11.

The present invention encompasses a processing method including storing a program that can operate the configuration described in the above-described exemplary embodiment in such a way as to realize the functions described in the above-described exemplary embodiment in a storage medium, reading the program from the storage medium as program codes, and causing a computer to execute the program codes. The present invention encompasses the storage medium storing the above-described program and the program itself.

The storage medium is, for example, a floppy (registered trademark) disk, a hard disk drive, an optical disk, a magneto-optical disk, a compact disc-ROM (CD-ROM), a magnetic tape, a nonvolatile memory card, or a ROM.

Further, the present invention is not limited to the processing system executing the program stored in the above-described storage medium. The present invention encompasses any other software or the one running on the OS to execute the operations of the above-described exemplary embodiments in cooperation with an expansion board.

As described above, the above-described exemplary embodiment enables a plurality of image formation processing units to effectively perform load distribution for the image formation processing to be performed on a drawing area included in a closed area according to dependency and rotational angle information for each object. Thus, the above-described exemplary embodiment can improve the performance in the image formation processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-234201 filed Oct. 25, 2011, which is hereby incorporated by reference herein in its entirety.

What is claimed is:

1. An image processing apparatus, comprising:
a first image processing unit configured to perform image processing on a drawing area;
a second image processing unit configured to be differentiated from the first image processing unit;
a load analysis unit configured to analyze a composition processing load of an object in the drawing area;
a rotational angle analysis unit configured to analyze a rotational angle of the object in the drawing area; and
a load distribution determination unit configured to determine whether to distribute a part of image formation processing to be applied on the drawing area from the first image processing unit to the second image processing unit based on the analyzed composition processing load of the object and the analyzed rotational angle of the object.

2. The image processing apparatus according to claim 1, wherein in a case where the load distribution determination unit determines to distribute a part of image formation processing to be applied on the drawing area from the first image processing unit to the second image processing unit, the first image processing unit acquires a pixel offset based on the rotational angle of the object and transmits the pixel offset to the second image processing unit, and the second image processing unit acquires pixel data according to the received pixel offset, and
wherein in a case where the load distribution determination unit determines not to distribute apart of image formation processing to be applied on the drawing area from the first image processing unit to the second image processing unit, the first image processing unit acquires a pixel offset based on the rotational angle of the object and acquires pixel data according to the received pixel offset.

3. The image processing apparatus according to claim 2, further comprising an attribute determination unit configured to determine whether an attribute of the object is an image attribute,
wherein in a case where the attribute determination unit determines that the attribute of the object is the image attribute, the rotational angle analysis unit performs analyzing processing of the rotational angle of the object.

4. The image processing apparatus according to claim 1, wherein the rotational angle analysis unit performs analyzing processing of the rotational angle of the object according to a result of the analyzing processing of the composition processing load of the object performed by the load analysis unit.

5. The image processing apparatus according to claim 1, wherein the image processing to be distributed is acquiring attribute information of the object that is not yet subjected to rasterizing processing.

6. The image processing apparatus according to claim 1, wherein the load analysis unit is configured to analyze the composition processing load based on the number of objects in the drawing area.

7. The image processing apparatus according to claim 1, wherein the load analysis unit is configured to analyze the composition processing load based on the number of image objects in the drawing area.

8. The image processing apparatus according to claim 1, wherein the load analysis unit is configured to determine whether object composition processing in the drawing area is permeabilization processing to analyze the composition processing load.

9. The image processing apparatus according to claim 1, wherein the rotational angle analysis unit is configured to determine whether the rotational angle of the object in the drawing area is 90 degrees or 270 degrees.

10. An image processing method performed by an image processing apparatus including a first image processing unit and a second image processing unit, the method comprising:
performing first image processing on a drawing area by the first image processing unit;
performing second image processing that is differentiated from the first image processing by the second image processing unit;
analyzing a composition processing load of an object in the drawing area;
analyzing a rotational angle of the object in the drawing area; and
determining whether to distribute a part of image formation processing to be applied on the drawing area from the first image processing to the second image processing based on the analyzed composition processing load of the object and the analyzed rotational angle of the object.

11. The image processing method according to claim 10, wherein in a case where the distribution is performed,
acquiring a pixel offset based on the rotational angle of the object, and transmitting the pixel offset to the second image processing unit by the first image processing unit;
acquiring pixel data according to the received pixel offset by the second image processing unit;
wherein in a case where the distribution is not performed,
acquiring the pixel offset based on the rotational angle of the object and acquiring the pixel data according to the pixel offset by the first image processing unit.

12. The image processing apparatus according to claim 11, wherein an attribute of the object is determined whether to be an image attribute, and in a case where the attribute of the object is determined to be an image attribute, the analyzing processing of the rotational angle of the object is performed.

13. The image processing apparatus according to claim 10, wherein the analyzing processing of the rotational angle of the object is performed according to a result of the analyzing processing of the composition processing load of the object.

14. The image processing method according to claim 10, wherein the image processing to be distributed is acquiring attribute information of the object that is not yet subjected to rasterizing processing.

15. The image processing method according to claim 10, wherein the composition processing load is analyzed based on the number of objects in the drawing area.

16. The image processing method according to claim 10, wherein the composition processing load is analyzed based on the number of image objects in the drawing area.

17. The image processing method according to claim 10, wherein it is determined whether object composition processing in the drawing area is permeabilization processing to analyze the composition processing load.

18. The image processing method according to claim 10, wherein it is determined whether the rotational angle of the object in the drawing area is 90 degrees or 270 degrees.

19. A non-transitory computer-readable medium storing a program that causes a computer to perform the image processing method according to claim 10.

* * * * *